United States Patent [19]

Kuo

[11] Patent Number: 5,043,702

[45] Date of Patent: Aug. 27, 1991

[54] LUGGAGE WITH ALARM DEVICE

[76] Inventor: Chun-Chang Kuo, Basement, No. 367, Tung Hsing Rd., Tainan, Taiwan

[21] Appl. No.: 592,378

[22] Filed: Oct. 3, 1990

Related U.S. Application Data

[63] Continuation of Ser. No. 520,856, May 9, 1990, abandoned, which is a continuation of Ser. No. 104,952, Oct. 6, 1987, abandoned.

[51] Int. Cl.[5] .......................... G08B 1/08; H04Q 7/00

[52] U.S. Cl. .................................... 340/539; 340/571; 340/572; 340/573; 340/574

[58] Field of Search ......................... 340/539, 571-574

[56] References Cited

U.S. PATENT DOCUMENTS

| | | | |
|---|---|---|---|
| 4,591,835 | 5/1986 | Sharp | 340/571 |
| 4,593,273 | 6/1986 | Narcisse | 340/539 |
| 4,598,272 | 7/1986 | Cox | 340/531 |
| 4,728,937 | 3/1988 | Hsu | 340/571 |

*Primary Examiner*—Donnie L. Crosland
*Attorney, Agent, or Firm*—Larson and Taylor

[57] ABSTRACT

Luggage having alarm device to protect against robbery, burglary and being inadvertently left behind comprises, inside the luggage, an alarm and shocker assembly that includes a siren and circuitry with a transformer to produce a high voltage. Bare electrical wires are spread around the inner wall of the luggage. A remote controller that is capable of dispatching a coded signal is used to activate the circuitry to produce a high voltage electric shock and/or sound an alarm to prevent the luggage from being carried away or stolen. The alarm assembly may further include a signal transmitting circuit and a receiving circuit and a buzzer may be added to the remote controller carried by the luggage owner. The effective distance can be preset for the response of a signal so that when the luggage is in a position beyond said preset distance, the alarm is triggered to warn that the luggage is being burglarized or is being inadvertently left behind.

8 Claims, 12 Drawing Sheets

FIG 6A
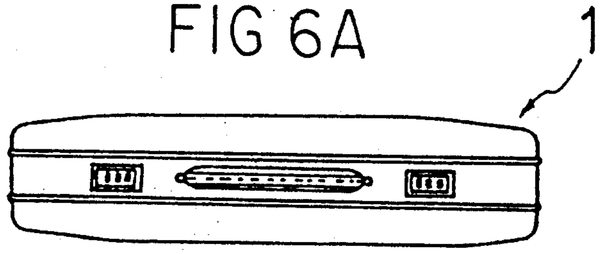
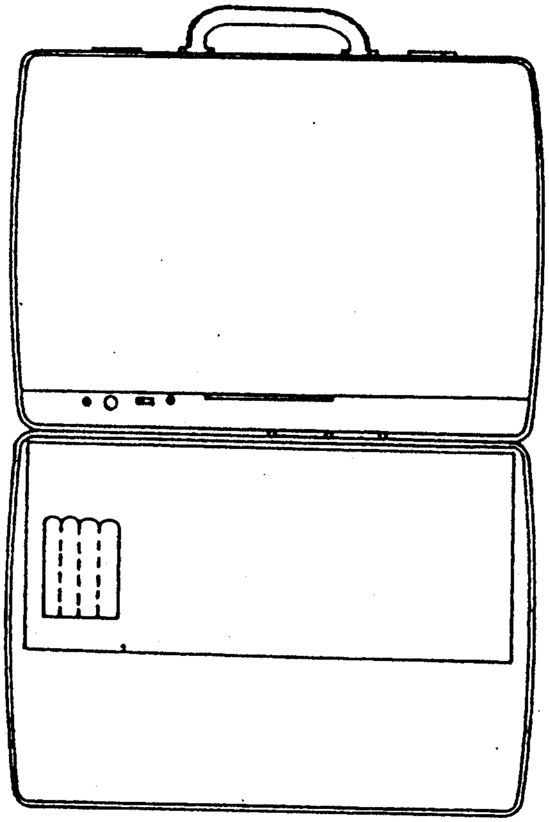
FIG. 6B

FIG. 9
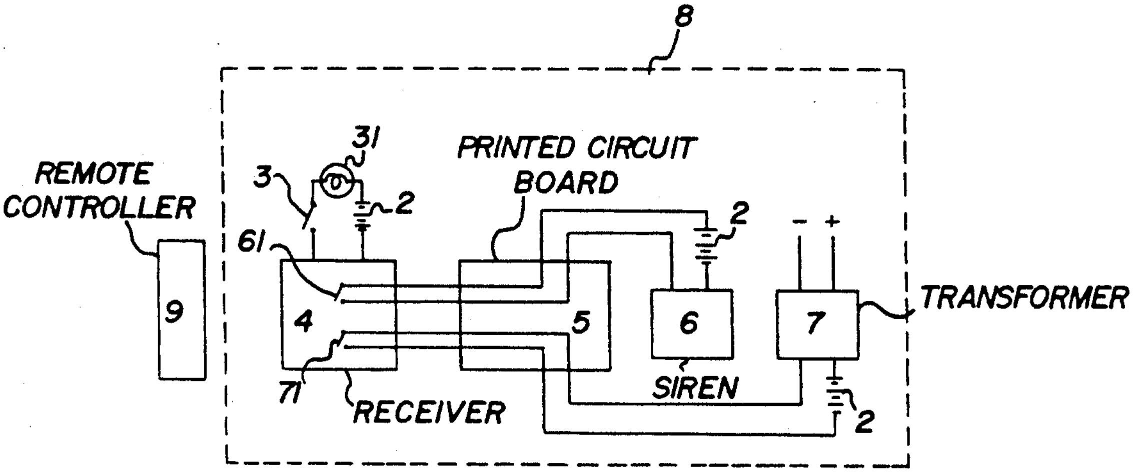
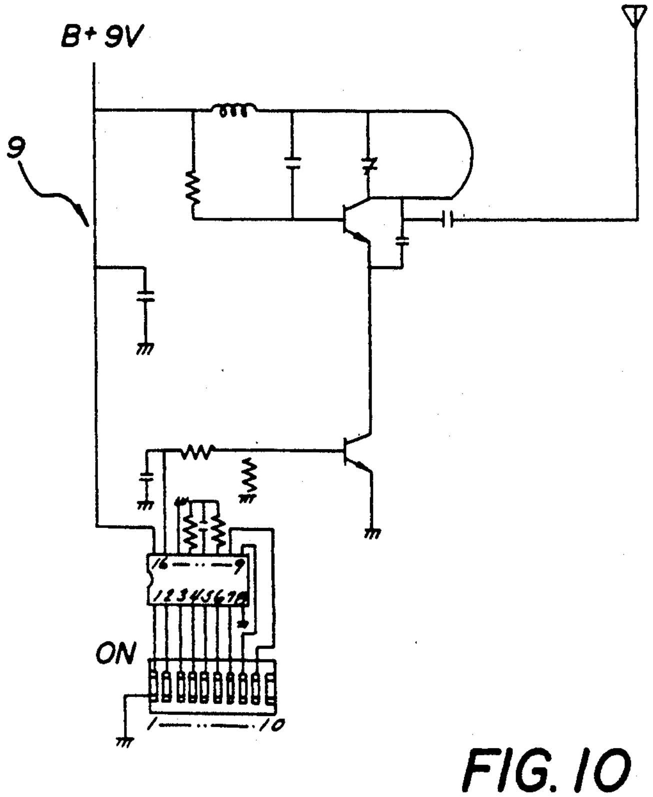
FIG. 10

LUGGAGE WITH ALARM DEVICE

This application is a continuation of application Ser. No. 520,856 filed May 9, 1990, now abandoned, which is a continuation of Ser. No. 104,952 filed Oct. 6, 1987, now abandoned.

FIELD OF THE INVENTION

The present invention relates generally to a luggage having an alarm device to protect against robbery, burglary and being inadvertently left behind, and more particularly relates to luggages, such as a brief case or hand bag, equipped with said device. When said luggage is being stolen, a remote controller can cause an alarm device in the luggage to produce a high voltage sufficient to give a shock to the robber and also to sound an alarm. When the luggage is being burglarized or inadvertently left behind, the remote controller produces a warning buzz.

BACKGROUND OF THE INVENTION

Personal luggage such as a brief case or hand bag usually used to store money and treasuries and thus are frequently the subject of robbery and burglary. In addition they can be inadvertently left behind. Any of these would result not only in the loss of property, but also could sometimes jeopardize the owner's life. Therefore the main object of the present invention is to provide a warning device against those offenses so as to protect the safety of the owner's life and property.

SUMMARY OF THE INVENTION

Luggage including brief cases and hand bags having an alarm device against robbery, burglary and being inadvertently left behind according to the present invention comprises inside the luggage case a well spaced pair of wiring of opposite electrical charge distributed around the inner wall of said luggage, and an alarm and shocker assembly including a siren and a transformer that produces a high voltage. When the brief case or hand bag is being stolen, the owner may refrain from an instant resistance to save his neck and later can actuate a remote controller at hand when the offender moves to a predetermined distance away. Then the wiring within the luggage becomes charged with high voltage electricity and gives a shock to the robber, who would be forced to give up the loot. In an additional embodiment, the robber can be frightened away by the simultaneous sound of a siren, so that the purpose of protection is achieved.

The above mentioned assembly may further be provided with a transmitting circuit and the remote controller can have a receiving circuit and a buzzer. The controller can be set with a predetermined effective distance so that when the related luggage is beyond said preset range, the receiving circuit in the controller would trigger an alarm on hand upon failing to receive the signal generated by the transmitter inside the luggage so that the owner is warned of the burglary or of the luggage being inadvertently left behind.

BRIEF DESCRIPTION OF THE DRAWINGS

Now the structural feature, the operation and the efficacy of the present invention is to be detailed by way of preferred embodiments with reference to the annexed drawings, of which:

FIG. 6A is a front elevation and FIG. 6B is a plan view of an embodiment of a suit case closed and opened, respectively, according to the present invention;

FIG. 9 is a block diagram of a circuit according to the present invention;

FIG. 10 is a circuit diagram of a transmitter in the remote controller 9 in the block diagram;

DETAILED DESCRIPTION OF THE PREFERRED EMBODIMENTS

Now referring to FIGS. 1 to 7, the luggage 1 of the present invention may be a hand bag (FIGS. 1 to 3), a brief case (FIGS. 4, 5), or a suit case (FIGS. 6, 7), having its inner wall distributed with wiring 11. Wiring 11 may be electrical conductors of bare wire, metal (tin) foil, electric plating or other metal conductors. The adjacent members, which together constitute a wire pair, are alternately, positively (+) and negatively (−) charged and the distance between members is about 2–5 cm.

Figure 1:
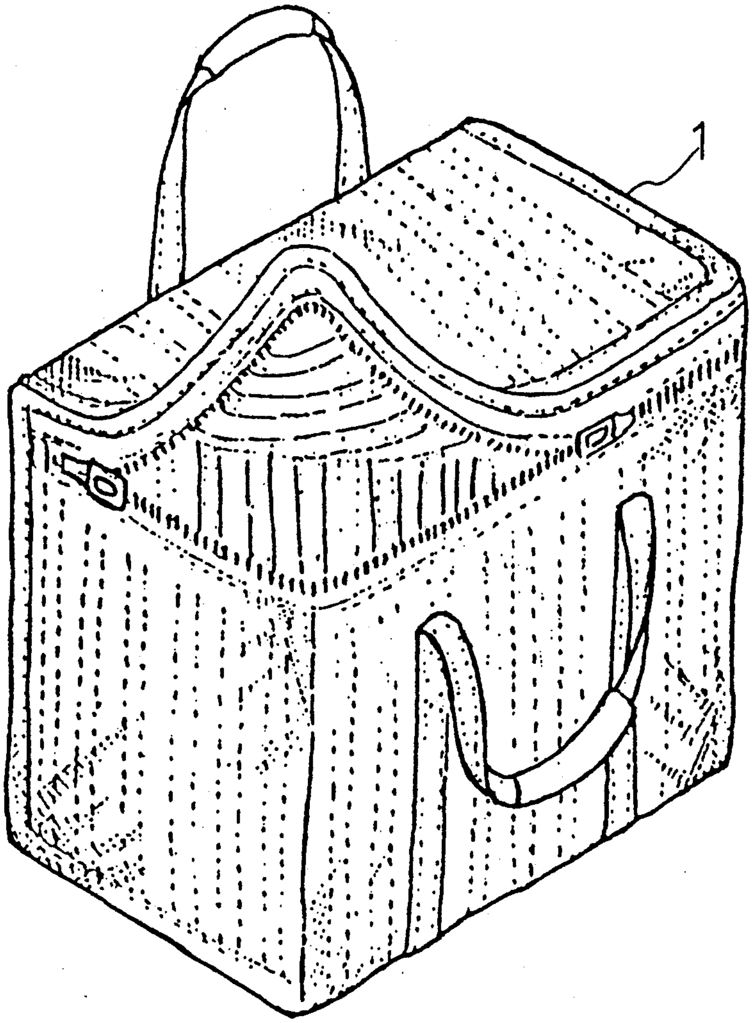
FIG. 1 is a perspective view of a hand bag in accordance with an embodiment of the present invention.
Figure 2:
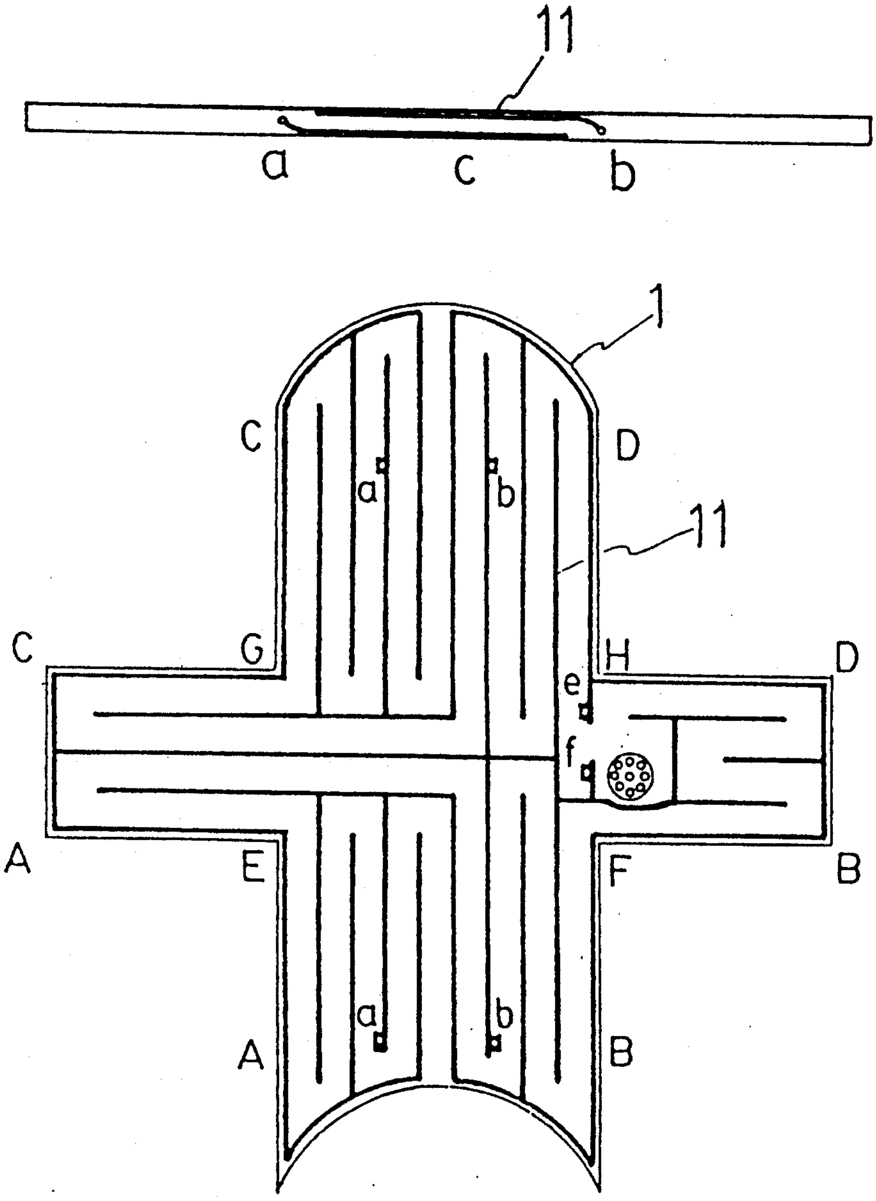
FIG. 2 is a schematic view showing the wiring distribution in the hand bag of FIG. 1.
Figure 3:
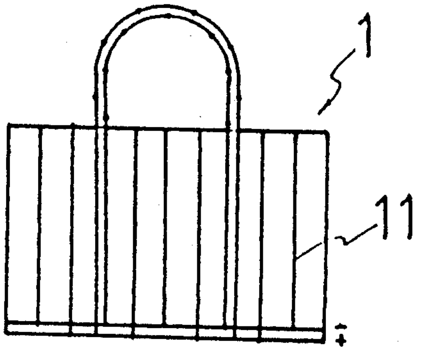
FIG. 3 is another embodiment of the wiring distribution in the hand bag.
Figure 4:
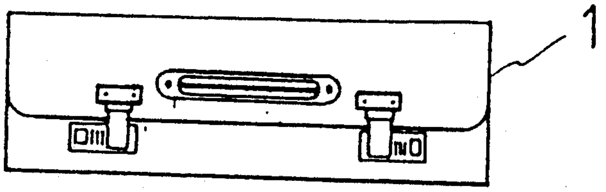
FIG. 4 is a plan view and an expansion of a brief case of another embodiment according to the present invention.
Figure 5:
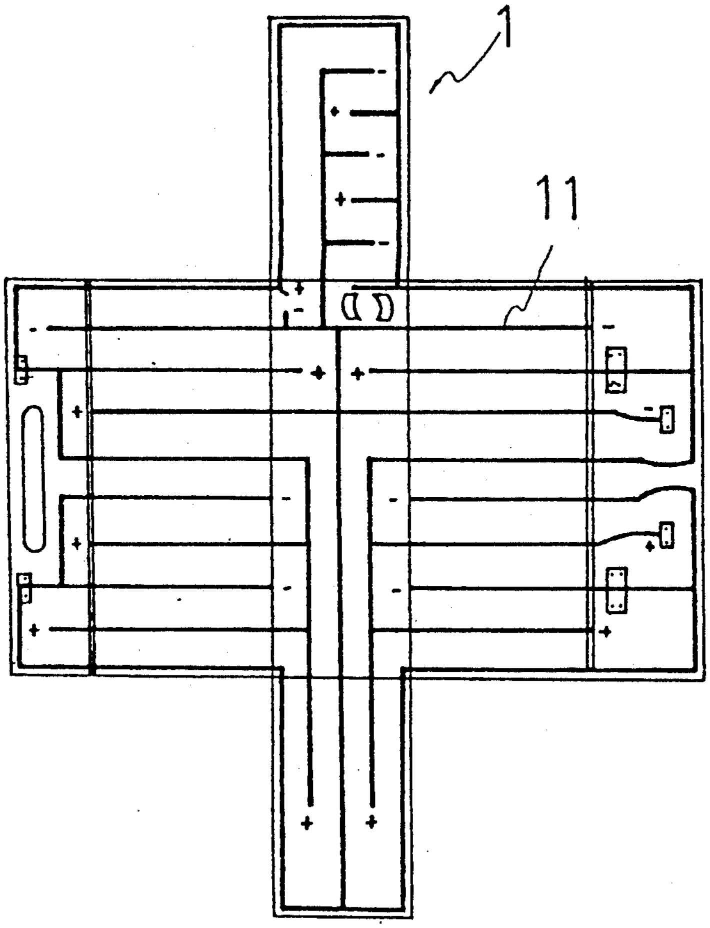
FIG. 5 is a schematic view showing wiring in a brief case of the above said embodiment.
Figure 7:
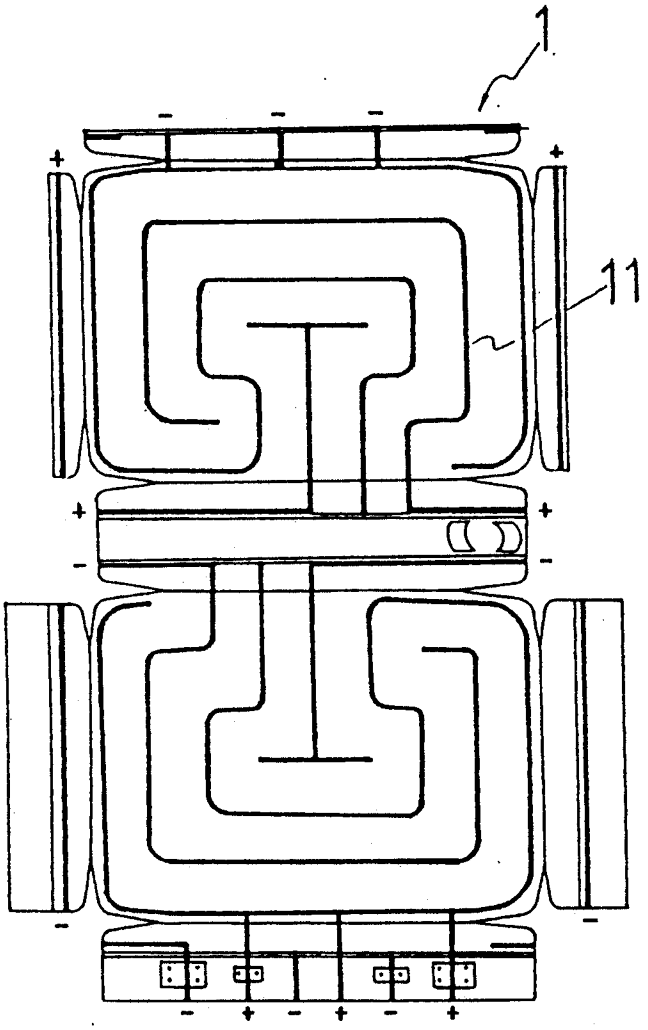
FIG. 7 is an expanded plan of the wiring within the said suit case.
Figure 8A:
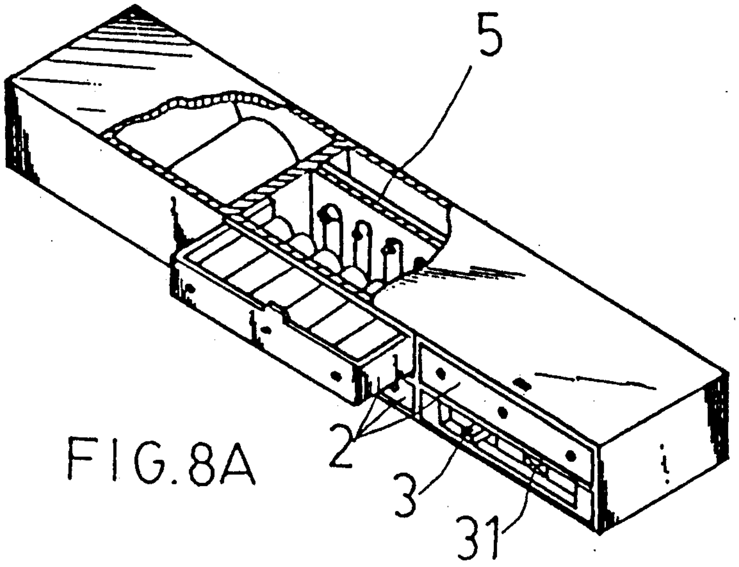
FIG. 8A is a perspective view taken from the top of an embodiment of a siren and shocker assembly with part thereof being cut away to show the inside details.
Figure 8B:
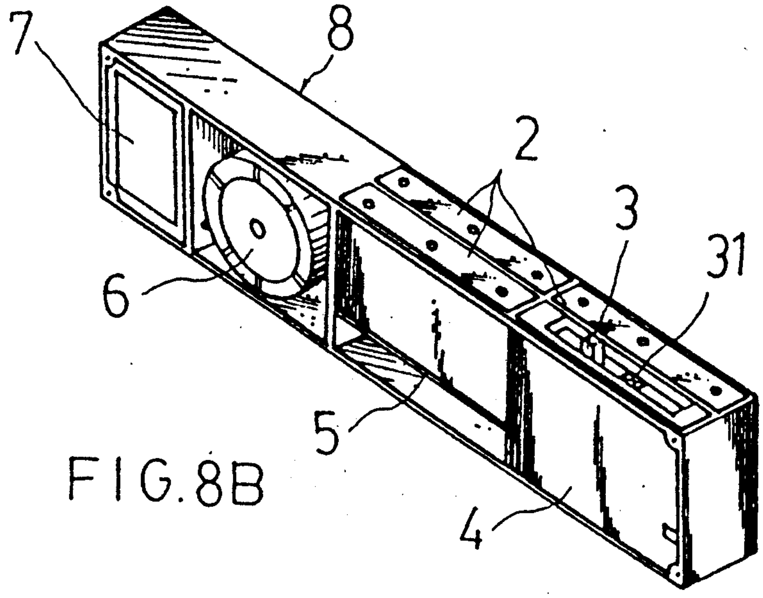
FIG. 8B is a perspective view taken from the front side of the same assembly shown in FIG. 8A.

In the bag or case, with reference to FIGS. 8A and 8B and FIG. 9, a siren and shocker assembly is disposed in a box 8. The assembly includes a plurality of battery sets 2 serving as a power source with an on/off switch 3, a pilot light 31, a receiver 4 with a printed circuit board 5, a siren (buzzer) 6 and its switch 61, and a transformer 7 with its switch 71. The output of the transformer 7 is connected to the conductor terminals of the wire pair 11 (See FIGS., 2, 3, 5 and 7). The said assembly is controlled by the remote controller 9, and the effective range can be preset at 50–100M.

In operation, source switch 3 is closed, and the pilot light 31 would in turn glow to show that the power is ON. The whole circuit (FIG. 9) is in a stand-by condition. Under this condition, if the bag or case is being stolen, in order to avoid the possible violence, the owner should just let the robber escape to beyond a distance where a direct attack is no longer possible (yet still within the effective range of the remote control). The controller is actuated by dispatching a coded signal from the transmitter 9 on hand. As soon as the receiver 4 received said signal from the controller, both siren switch 61 and transformer switch 71 being closed, the siren circuit and the transformer circuit are activated or turned ON through the circuit board 5. The siren 6 sounds the alarm and the transformer 7 provides a voltage as high as 40 KV to the terminals of the conductors scattered around the luggage's inner wall. The voltage causes a shock to the robber who should give up the loot and dart away from the scene. Thus not only can the property of the owner be preserved, but a life threatening situation is also prevented.

Figure 12:
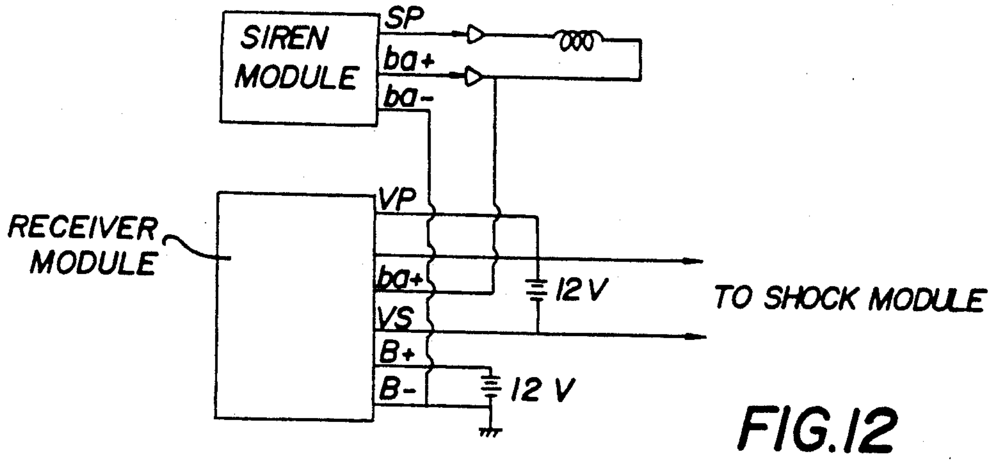
FIG. 12 is a circuit diagram showing the printed circuit board (PCB) connection in the block diagram of FIG. 9.
Figure 13:
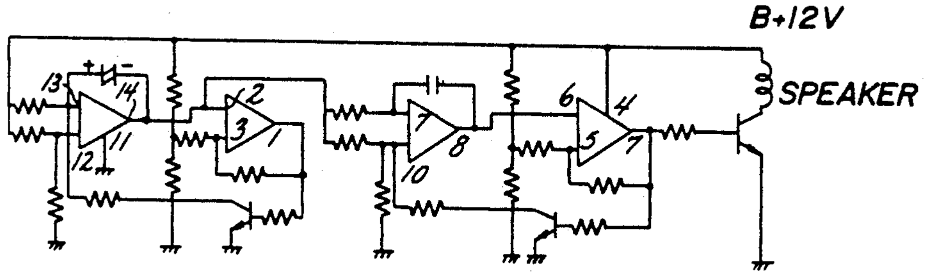
FIG. 13 is a circuit diagram of the siren 6 in the block diagram of FIG. 9.
Figure 14:
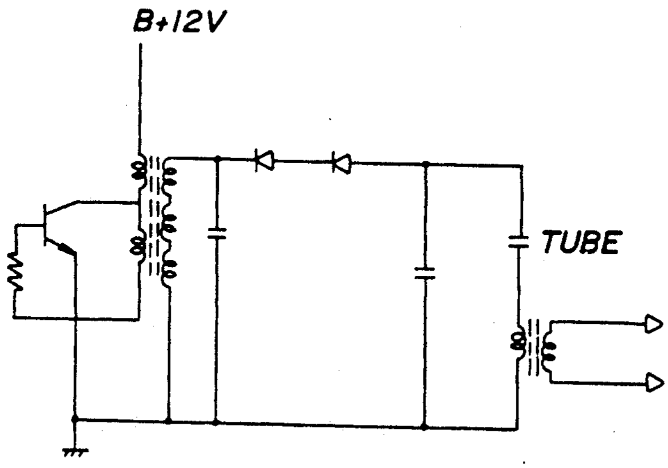
FIG. 14 is a circuit diagram of the shocker 7 in the block diagram of FIG. 9.

The circuits of the printing circuit board 5, siren circuit 6 and the shocker circuit 7 are shown in FIGS. 12, 13 and 14. As indicated in FIG. 14, the secondary voltage generated by the transformer is as high as 40 KV from the trigger conversion and current oscillation exchanging circuits.

Figure 15:
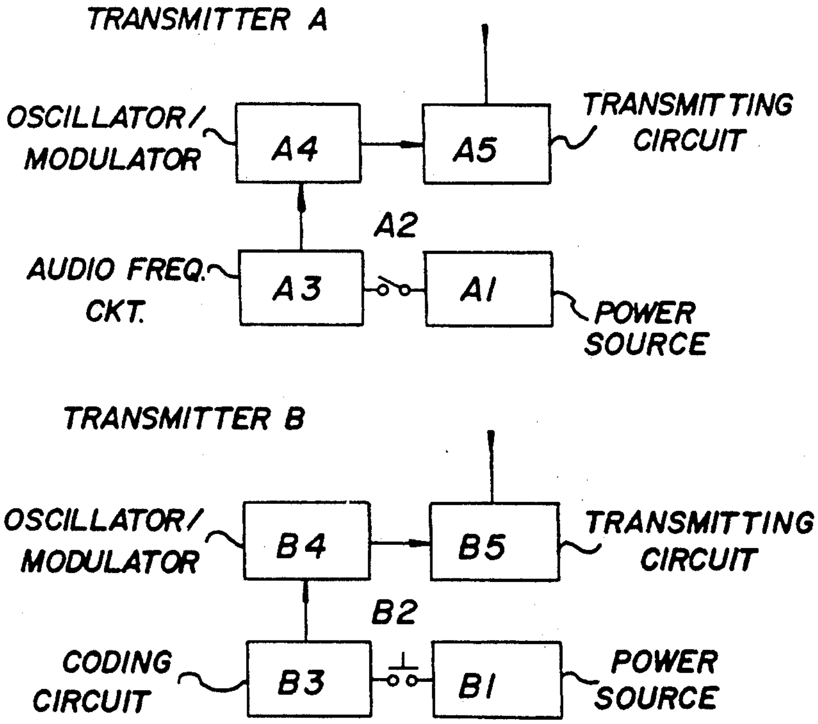
FIG. 15 is a block diagram showing alternative embodiments A and B of the transmitter 9 as shown in the block diagram of FIG. 9.

Transmitters A and B in FIG. 15 may be selected optionally as alternatives of remote controller 9. The circuit diagram of transmitter A comprises the following blocks: Power source A1 —Switch A2—Audio frequency circuit A3—Oscillating modulation circuit A4—Transmitting circuit A5. The circuit diagram of transmitter B comprises the following blocks: Power source B1—Switch B2—coding circuit B3—Oscillating modulation circuit B4—Transmitting circuit B5. The corresponding circuit diagram is shown such as in FIG. 10.

Figure 11:
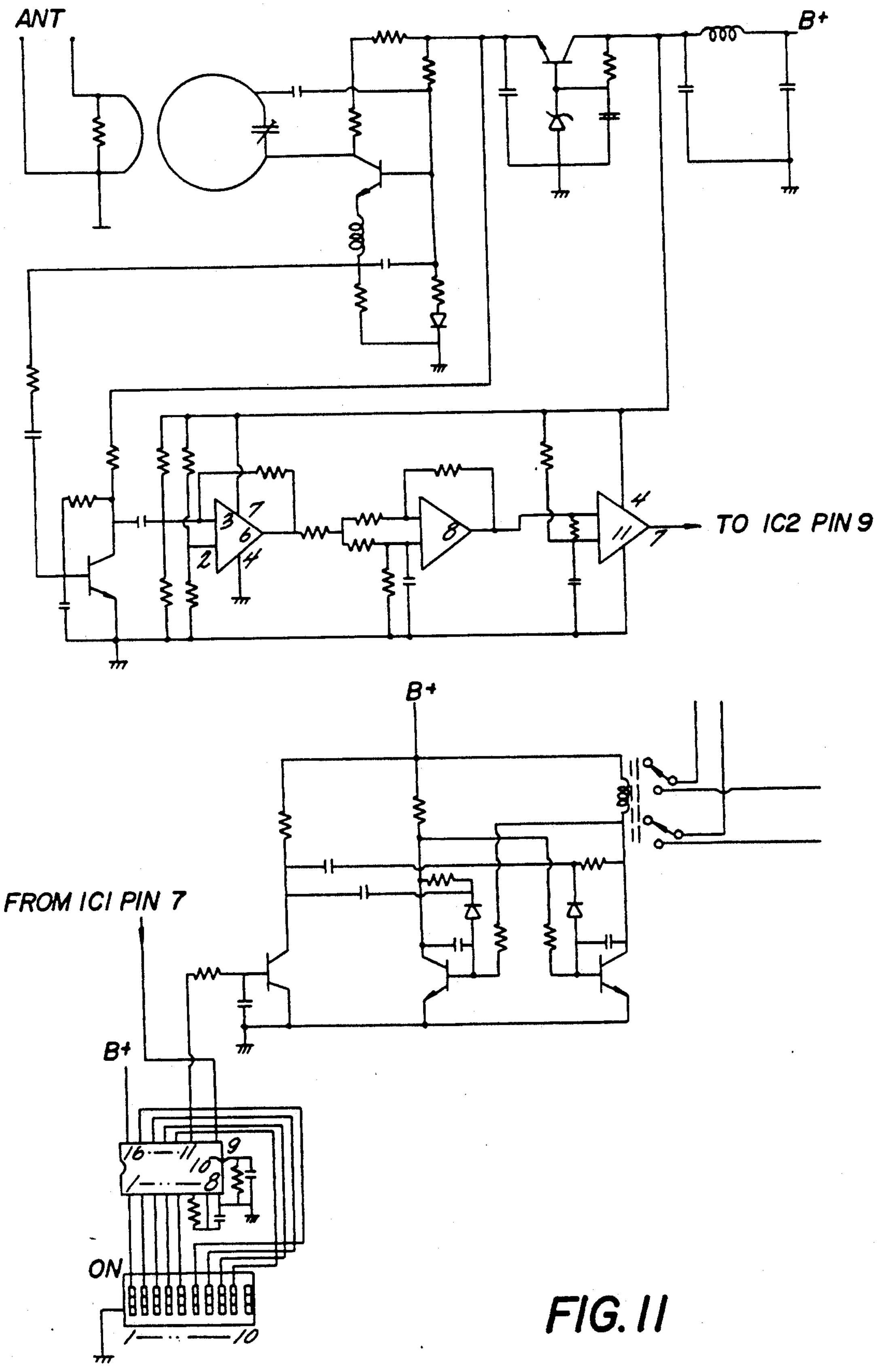
FIG. 11 is a circuit diagram of a receiver 4 in the block diagram of FIG. 9.
Figure 16:
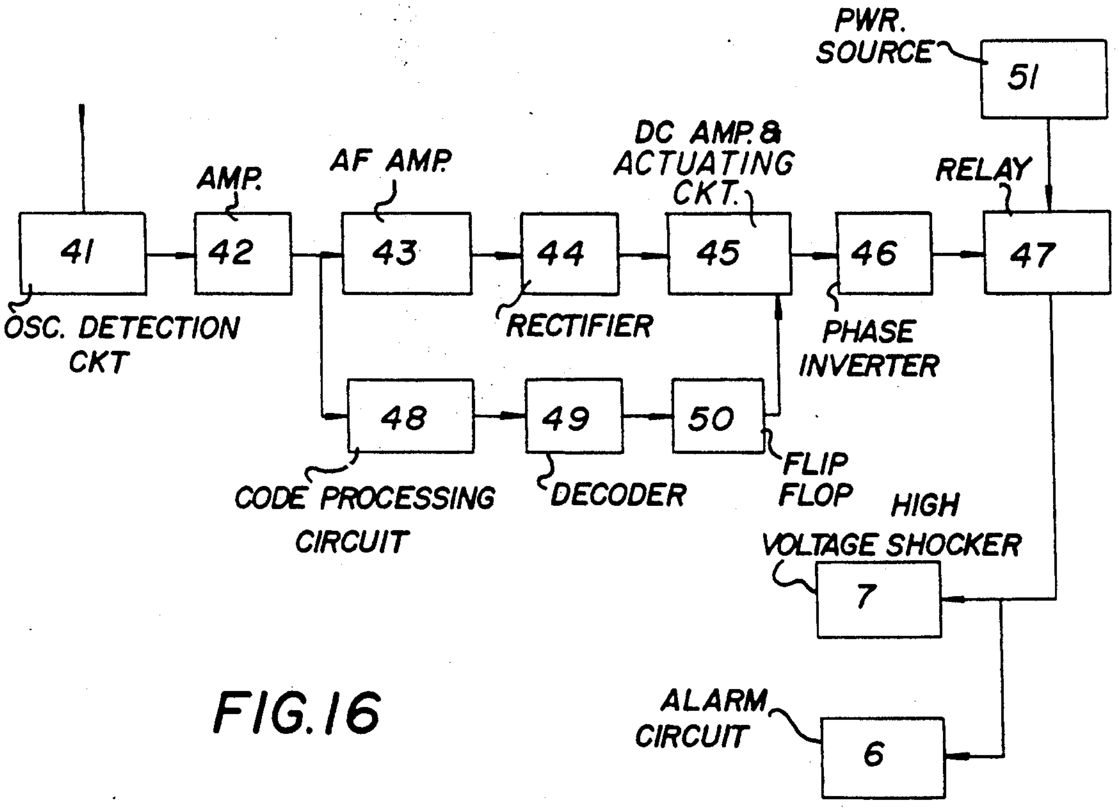
FIG. 16 is a block diagram of another embodiment of receiver 4.

The block diagram of the receiver 4 of the siren and shocker assembly installed within the hand bag or brief case with the circuit such as depicted in the FIG. 11, is shown in FIG. 16, and includes: Oscillating detection circuit 41—Amplifying circuit 42—AF amplifying circuit 43—rectifying circuit 44—DC amplifying and actuating circuit 45—Phase inverter 46—Relay 47—High tension shocker circuit 7 and alarm circuit 6. The output from amplifying circuit 42 is also delivered to a code processing circuit 48—Decoding circuit 49—Flip Flop 50, and then returns to DC amplifying and actuating circuit 45. The relay 47 controls the application of voltage from a controlled power source 51. The operation and the action of the circuit is now described as follows with reference to FIG. 15A:

(1) When the switch from the power source A1 of the controller (transmitter) A is closed, a modulated signal can be continuously transmitted, its effective range being 10–15M. Within this distance, upon receiving the signal, the receiver in the hand bag or brief case (already with power ON) would extract the signal to idle the relay 47. Therefore the siren and shocker circuit are deenergized and the shocker and siren would not work. But if the hand bag or case departs beyond 10–15M from the remote controller or by a cut OFF of the power source of the remote controller A, the hand bag or brief case no longer receives a signal, the relay actuates to apply power from the power source of the siren and shocker circuit which in turn triggers the alarm and provides the high voltage for shocking.

(2) After remote controller A starts to transmit a signal, if the hand bag or case is beyond 10–15M range, alarm and shock should be triggered for the reason state in (1). Yet in case there is interference signal from outside source, although the luggage is already beyond the preset range, the receiver still can receive a signal from another source with the same frequency as that transmitted from controller (transmitter) A, and which would cause the relay to remain unactuated, thereby preventing the alarm and shocker from working. A remedy to this possibility is to actuate on time the alarm and shocker. The remote controller (transmitter B) is caused to dispatch a signal, of which the effective range is set at, say 50–100M. As soon as the receiver 4 in the luggage begins to receive the signal from the controller B, which signal is decoded to generate a controlling voltage to cut off the pushing circuit 45, which in turn actuates relay 47 to trigger the alarm and the shocker.

If it is desired to stop the alarm and the shocker, the remote controller A (with power ON) may be caused to approach the said luggage within the range of 10–15M, then stop the transmitting from controller B to resume operation of the actuating circuit 45 which had been cut out. This stops the action of the relay 47 and the alarm and the shocker would naturally be halted.

(3) Once the power source of the remote controller A is ON, within the preset range of 10–15M, the luggage would continuously receive signals by way of receiver 4 and the alarm and shocker would not work for the reasons mentioned in (1). Yet if it is desired to cause the alarm and the shocker to work within 10–15M range, or intend to stop them when they have been working, this may be effected through the ON/OFF switch of controller A or by the operation of controller B mentioned in (2).

(4) Once the signal dispatched by the remote controller is received, the transmitting should be stopped immediately. If adverse change is required, repeat the transmitting once more, and the operation should be stopped as soon as the signal is received. As for whether the signal is being received or not, the judgement can be made through observation of the transition working condition of the alarm and the shocker, either from "yes" to "no" or from "no" to "yes".

Figure 17A:
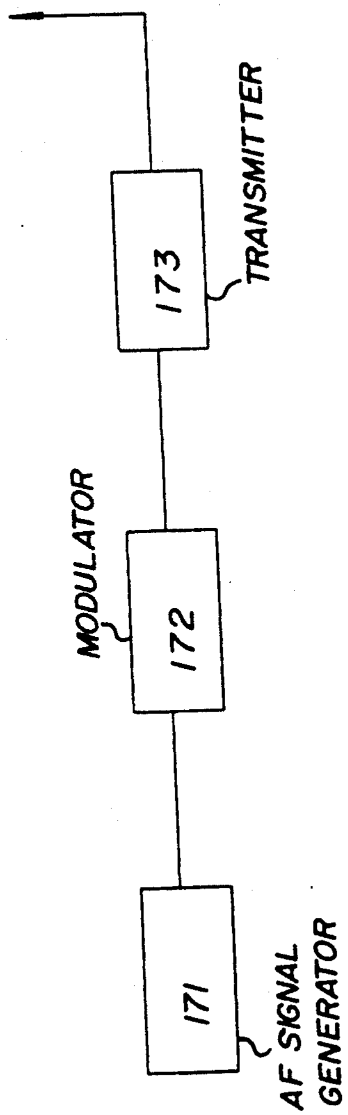
FIG. 17A is a block diagram showing the transmitting circuit or the remote controller 9 in FIG. 9.
Figure 17B:
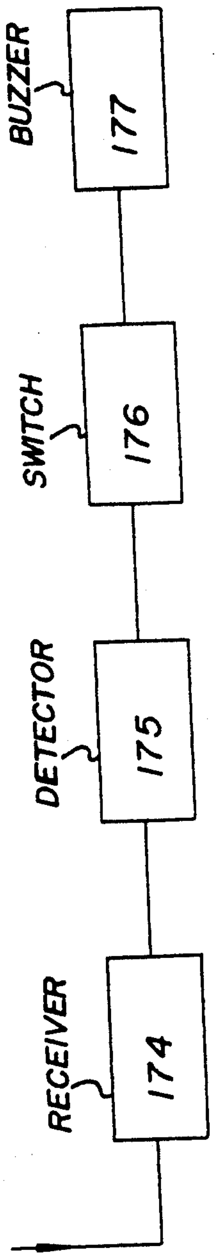
FIG. 17B is a block diagram showing the receiving circuit of the remote controller 9 in FIG. 9.

A transmitter depicted in FIG. 17A and a receiver depicted in FIG. 17B are provided in the present invention to perform the function of theft prevention and preventing an inadvertent leaving of the luggage.

The transmitter of FIG. 17A is installed within the luggage and may be incorporated into the box 8 or otherwise separately disposed, wherein an AF signal is generated by generator 171, is modulated by modulator 172 to become a high frequency signal for dispatching by a transmitter 173.

The receiver 17B is to be carried around, which may be incorporated into the remote controller or separately installed. The high frequency signal generated by generator 171, is modulated by modulatory 172 and transmitted by the transmitter 173. When the signal is received by receiver 174 and detected by a detector 175, it is sent through a circuit switch 176 to activate a buzzer 177.

The effective distance to be set between the transmitter 17A and the receiver 17B ranges preferably around 5M. Within this range the signal will be strong and the circuit switch is OFF, beyond that distance the signal will be weak or zero, and switch 176 will be ON. Therefore when the distance between the luggage and the transmitter A is less than 5M, receiving circuit is nonworking, while over 5M, buzzer 177 would sound a warning to prevent the luggage from being burglarized or inadvertently left behind.

What is claimed is:

1. In combination, luggage and a theft prevention means for helping to prevent robbery or burglary of the luggage, said luggage comprising:

a luggage container having enclosing walls; and said theft prevention means comprising:

a high voltage power supply mounted to said container;

a conductor pattern mounted to said container, said conductor pattern comprised of a plurality of uninsulated electrical conductors;

a remote, first controller and a remote, second controller, both to carried by an operator, said first controller including a power source, and a first transmitter means for sending a first signal;

said second controller including a source of power, and a second transmitter means for transmitting a second signal;

a receiver circuit located with said container and including a first means for receiving and monitoring the reception of said first and second signals from said first and second remote controllers, and determining when there is a significant change in the reception of said first signal;

a second means for connecting said conductors to said high voltage power supply, and thus energizing said conductors to provide a shocking voltage, when there is a significant change in the reception of said first signal; and a third means for causing the connection of said conductors to said high voltage power supply, and thus energizing said conductors to provide a shocking voltage, when there is a significant change in the reception of said second signal irrespective of the reception or lack of reception of said first signal.

2. A luggage as claimed in claim 1 and further including a means for making an alarming noise; and wherein said receiver circuit also activates said alarm means when there is a significant change in the reception of said second signal.

3. A luggage as claimed in claim 1 wherein said second remote controller further includes switch means for activating the transmission of said second signal irrespective of the detection of said first signal.

4. A luggage as claimed in claim 1 and further including a switch means for preventing the energization of said conductors.

5. A luggage as claimed in claim 1 wherein said high voltage power supply provides first and second voltage outputs of different polarity; and wherein said conductor pattern is comprised of a plurality of uninsulated electrical conductors spaced relatively apart a distance of about 2 centimeters to about 5 centimeters, each conductor being connectable to either said first or said second voltages, and adjacent said conductors being connected to different polarity voltages.

6. A luggage as claimed in claim 1 and further including a switch means for preventing the activation of said alarm means.

7. In combination, luggage and an alarm means to help prevent robbery, burglary, or an inadvertent leaving of the luggage, said luggage comprising:

a luggage container having enclosing walls; and a first remote controller mounted in said container that includes a power source, and a first transmitter means for sending a first signal;

a second remote controller to be carried by an operator and which includes a further power source, a first receiving means for receiving said first signal, and a transmitter means responsive to said first receiving means receiving said first signal for transmitting a second signal;

means for making an audible alarming noise when activated; and a receiver circuit means for receiving said second signal from said second remote controller, for detecting the reception of said second signal, and for activating said alarm means when there is a significant change in the reception of said second signal.

8. A luggage as claimed in claim 7 wherein said second remote controller further includes switch means for activating the transmission of said second signal irrespective of the detection of said first signal.

* * * * *